United States Patent [19]

Masler, III et al.

[11] Patent Number: 4,566,973

[45] Date of Patent: Jan. 28, 1986

[54] SCALE INHIBITION IN WATER SYSTEMS

[75] Inventors: William F. Masler, III, Hinckley; Zahid Amjad, Avon Lake, both of Ohio

[73] Assignee: The B. F. Goodrich Company, Akron, Ohio

[21] Appl. No.: 638,158

[22] Filed: Aug. 6, 1984

[51] Int. Cl.$^4$ ................................................ C02F 5/12
[52] U.S. Cl. ...................................... 210/701; 203/7; 252/8.55 B; 252/180; 426/271
[58] Field of Search .................... 203/7; 210/638, 639, 210/698–701; 252/180, 181, 8.55 B; 422/16, 17; 426/271, 580, 599

[56] References Cited

U.S. PATENT DOCUMENTS

| | | | |
|---|---|---|---|
| 3,085,916 | 4/1963 | Zimmie et al. | 210/698 |
| 3,285,886 | 11/1966 | Gunderson et al. | 210/701 |
| 3,463,730 | 8/1969 | Booth et al. | 210/701 |
| 4,026,815 | 5/1977 | Kallfass et al. | 210/700 |
| 4,389,324 | 6/1983 | Keller | 210/698 |
| 4,432,884 | 2/1984 | Kawasaki et al. | 210/698 |

Primary Examiner—Peter Hruskoci
Attorney, Agent, or Firm—George A. Kap; Alan A. Csontos

[57] ABSTRACT

In a preferred embodiment, this invention relates to a method for inhibiting formation of phosphate scale in water systems by the addition of a threshold amount of a water-soluble copolymer of 40 to 95 weight parts of an acrylic acid with 5 to 60 parts of a substituted acrylamide, based on a total of 100 parts of polymerized monomers.

15 Claims, No Drawings

SCALE INHIBITION IN WATER SYSTEMS

BACKGROUND OF THE DISCLOSURE

Most industrial waters contain alkaline earth metal cations, such as calcium, barium, magnesium, etc., and several anions such as bicarbonate, carbonate, sulfate, phosphate, silicate, fluoride, etc. When combinations of these anions and cations are present in concentrations which exceed the solubility of their reaction products, precipitates form until these product solubility concentrations are no longer exceeded. For example, when the ionic product of calcium and carbonate exceeds the solubility of the calcium carbonate, a solid phase of calcium carbonate will form.

Solubility product concentrations are exceeded for various reasons, such as partial evaporation of the water phase, change in pH, pressure or temperature, and the introduction of additional ions which form insoluble compounds with the ions already present in the solution.

As these reaction products precipitate on surfaces of the water carrying system, they form scale or deposits. This accumulation prevents effective heat transfer, interferes with fluid flow, facilitates corrosive processes, and harbors bacteria. This scale is an expensive problem in many industrial water systems, causing delays and shutdowns for cleaning and removal.

Scale-forming salts can be prevented from precipitating by complexing the cations with chelating or sequestering agents so that the solubility of the reaction products is not exceeded. Generally, this requires stoichiometric amounts of chelating or sequestering agent with respect to the scale-forming cation, which amounts are not always desirable or economical.

More than 25 years ago it was discovered that certain inorganic polyphosphates would prevent such precipitation when added in amounts far less than the concentrations needed for sequestering or chelating. When a precipitation inhibitor is present in a potentially scale-forming system at a markedly lower concentration than that required for sequestering the scale forming cation, it is said to be present in a "threshold" amount. Threshold inhibition describes the phenomenon whereby a substoichiometric amount of a scale inhibitor can stabilize a solution from precipitation which solution can contain hundreds of thousands of parts of scale-forming ions. Threshold inhibition generally takes place under conditions where a few, i.e, 1 to 10 ppm, of a polymeric inhibitor will stabilize in solution from about 100 to several thousand ppm of a scale-forming mineral.

As already discussed above, whereas threshold inhibition occurs at substoichiometric ratios of inhibitor to scale-forming cation, sequestration requires a stoichiometric ratio of sequestrant to scale-forming cation to maintain that cation in solution. Generally, sequestering takes place at a weight ratio of threshold active compound to scale-forming cation components of greater than about ten to one, depending on the anion components in the water. Threshold inhibition, however, generally takes place in a weight ratio of threshold active compound to scale forming cation components of less than about 0.5 to 1.0. For example, a calcium sulfate solution containing 1820 ppm of calcium ions and 4440 ppm of sulfate ions is thermodynamically unstable. Unless a scale inhibitor is added, precipitation in such a system will take place within about one-half hour. To control precipitation of calcium sulfate from the supersaturated solution, the following two approaches are available:

(a) to complex or sequester calcium ions with a complexing agent such as ethylenediamine tetraacetic acid (EDTA) or nitrilotriacetic acid (NTA). Amount of each required to completely complex calcium ions would be stoichiometric, i.e, 1:1 ratio of Ca:EDTA or about 13300 ppm of EDTA to sequester 1820 ppm of calcium;

(b) on a threshold basis, one would need a substoichiometric amount of about 2 ppm of a polyacrylate to completely inhibit precipitation of calcium sulfate.

Therefore, on the basis of the above discussion, the tremendous difference between sequestration and threshold inhibition reflects the obvious advantages of the latter over the former.

In the past, chromate compounds and strong inorganic acids have been added to industrial water systems to reduce both corrosion of iron and scale formation. The chromate compounds have been used to reduce corrosion whereas strong inorganic acids have been used to reduce scale formation since scale formation is generally lower at acidic pH. Presently, however, the discharge of chromate compounds in the effluent is not permitted for the reason that the chromate compounds appear to be toxic and therefore, are deleterious to the environment.

To provide for the anticorrosion function of the chromate compounds of the past, polyphosphate and phosphate materials can and presently used as anticorrosion agents. Therefore, whereas in the past, emphasis has been on reducing scale formation of such scales as calcium carbonate and calcium sulfate, presently, the emphasis is on reducing formation of the phosphate scales such as calcium phosphate, zinc phosphate and magnesium phosphate.

The closest prior art known is the Booth et al U.S. Pat. No. 3,463,730 which relates to prevention of scale formation in water systems. More specifically, this patent relates to scale inhibition by the addition of up to 100 ppm of a hydrolyzed polyacrylamide to a water system containing insoluble salts, particularly carbonates and sulfates of metals such as calcium or other alkaline earth metals and/or iron, as well as particles of silt or silica. The polyacrylamide has about 10 to 50% unhydrolyzed amide groups and a molecular weight of about 1,000 to 8,000. It can be prepared in a number of different ways, including copolymerization of acrylic acid and acrylamide. By definition, the polyacrylamide described in the Booth et al patent has 50 to 90% of its amide groups hydrolyzed to acid or salt form.

Other pertinent prior art relating to phosphate inhibition includes U.S. Pat. Nos. 3,928,196, 4,029,577, 4,209,398, 4,253,968, 4,324,664 and 4,326,980. Generally, these patents disclose polymer inhibition compositions based on polymers of unsaturated carboxylic acids and other unsaturated monomers. Examples of unsaturated carboxylic acids include acrylic acid, methacrylic acid, and maleic acid. The other unsaturated monomers are diverse, but include hydroxyalkyl acrylates, allyl acetate, 2-acrylamido-2-methyl propanesulfonic acid, etc.

SUMMARY OF THE INVENTION

This invention particularly relates to a method of inhibiting formation of scale and/or formation of scale-forming phosphate salts in water systems, which method comprises the step of adding to the system a small amount of a water-soluble copolymer of 40 to 95 weight parts of an acrylic acid with 5 to 60 weight parts of a substituted acrylamide, based on a total weight of 100 parts of the monomers.

DETAILED DESCRIPTION OF THE INVENTION

This invention relates to a method for dispersing and maintaining dispersed particulate matter in an aqueous medium containing such matter and/or for controlling the deposition of scale-imparting precipitates on surfaces of equipment used in recirculating or the once-through water systems containing such precipitates, or precipitate-forming ions, under conditions which form the precipitates. The method comprises the step of adding to preferably neutral or alkaline water a small amount, i.e., in the range from about 1 part per million (ppm) to about 200 ppm, of a copolymer defined herein to inhibit deposition of the precipitates, particularly those selected from calcium phosphate, calcium carbonate, calcium sulfate, barium sulfate, magnesium phosphate, magnesium hydroxide, calcium silicate, magnesium silicate, iron oxide, zinc hydroxide, zinc phosphate, calcium fluoride, calcium oxalate, and mixtures thereof.

The invention described herein is particularly directed to threshold inhibition in typical cooling water process streams. However, other process water streams which contain concentrations of ions far in excess of typical cooling water streams may also be effectively treated for scale inhibition with the copolymers of our invention in concentrations from about 1 ppm to about 200 ppm, and in some instances as high as 500 ppm, where the cost is justified. Such other process water streams include brine solutions such as are processed in desalination plants, particularly in the multiple evaporators thereof; and in brackish waters containing a high concentration of salts such as are typically encountered in membrane devices for reverse osmosis processes. Still other process water uses are in various oil field applications for scale inhibition in conduits circulating saline and oily water, where the water is present in a major amount by weight, most particularly in secondary oil recovery operations.

It has also been found that copolymers of our invention appear to be non-toxic to humans when used in aqueous systems such as fruit juices in a small amount in the range from about 0.05 to about 10 ppm, more preferably from about 0.1 to about 1 ppm. Such copolymers may be used to inhibit the deposition of calcium oxalate scale inside equipment used to process the sucrose and other sugar-containing juice extracted from various fruits, particularly the juice extracted by crushing and pressing sugar cane and sugar beets.

In accordance with the invention described herein, it has been discovered that copolymers of an acrylic acid and a substituted acrylamide are effective in water systems to reduce or inhibit formation and deposition of scale. These copolymers have molecular weight in the range of about 1,000 to 50,000, preferably about 2,000 to 20,000. The molecular weight given herein is weight average molecular weight (Mw), as measured by gel permeation chromatography. Suitable copolymers are prepared by polymerizing 40 to 95 weight parts of an acrylic acid and 5 to 60 weight parts of a substituted acrylamide. In a preferred embodiment, the copolymers are prepared by polymerizing 50 to 90 weight parts of an acrylic acid and 10 to 50 weight parts of a substitute acrylamide, the amounts being based on a total of 100 weight parts of the comonomers.

The copolymers suitable herein are random polymers containing polymerized units of an acrylic acid and substituted acrylamide, represented by the following structural formula I:

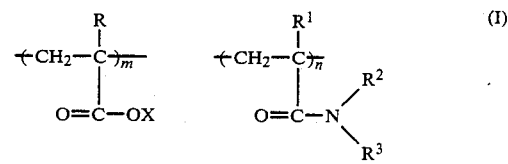

where m and n are numbers in the range of about 0.1 to 700, with m being in the range of about 10 to 700 and n is in the range of about 0.1 to 350, subject to the molecular weight limitations; R and $R^1$ are individually selected from hydrogen and methyl; X is hydrogen, alkali metal, alkaline earth metal, or ammonium, particularly hydrogen, sodium, potassium, calcium, ammonium, and magnesium; and $R^2$ and $R^3$ are individually selected from hydrogen, alkyl and substituted alkyl groups each containing a total of 1 to 8 carbon atoms, provided that both $R^2$ and $R^3$ are not hydrogen although either $R^2$ or $R^3$ can be hydrogen. Substituents on the $R^2$ and $R^3$ groups include alkyl, aryl, and keto groups, however, in a preferred embodiment, $R^2$ and $R^3$ are individually selected from alkyl groups of 1 to 8 carbon atoms and substituted alkyl groups of 1 to 8 carbon atoms containing a keto substituent group. Specific examples of $R^2$ and $R^3$ include t-butyl, isopropyl, isobutyl, methyl, 2-(2,4,4-trimethylpentyl) and 2-(2-methyl-4-oxopentyl).

As will be shown, acrylamide itself when copolymerized with an acrylic acid is ineffective as a phosphate scale inhibitor. Likewise, neither free monomeric nor polymeric acrylic acid nor substituted polymeric or monomeric acrylamide are sufficiently effective as scale inhibitors. This is surprising and unexpected.

Suitable acrylic acids for purposes herein are generally defined as monounsaturated monocarboxylic acids containing 3 to 4 carbon atoms. Specific examples of such acids include acrylic and methacrylic acids, with acrylic acid being preferred. Substituted acrylamides referred to herein are generally defined to include the class of acrylamides substituted on the nitrogen atom with alkyl groups each containing 1 to 8 carbon atoms.

Other comonomers can be used with an acrylic acid and a substituted acrylamide provided that such additional comonomers do not deleteriously affect the desired properties. Examples of such comonomers include acrylate and methacrylate esters, acrylamide and methacrylamide, acrylonitrile, vinyl esters, etc.

The acrylic acid units in the copolymer can be in the acid form or in a neutralized form where the hydrogen of the carboxyl group is replaced with an alkali metal, alkaline earth metal, or an ammonium cation, depending on the neutralizing medium. Generally, the copolymers can be neutralized with a strong alkali, such as sodium hydroxide, in which instance, the hydrogen of the carboxyl group of the acrylic acid units will be replaced with a sodium. With the use of an amine neutralizing agent, the hydrogen will be replaced with an ammonium group. Useful copolymers include copolymers that are unneutralized, partially neutralized, and completely neutralized.

The monomers can be prepared, if desired, in a conventional manner but they are commercially available and therefore, can be purchased. Polymerization of the monomers results in an essentially non-crosslinked random copolymer, the molecular weight of which can be adjusted with a little trial and error. The copolymer is preferably formed in a high yield ranging from about 50% to about 99% by weight of the comonomers.

It is also a requirement that the copolymer be soluble in water. Typically, the copolymer is used in water in the range of 0.05 to 500 ppm. Thus, high solubility of water treatment compositions is not essential but desirable. The product is preferably shipped in drums as a concentrated aqueous solution containing in the range of about 20% to about 50% by weight of solids per 100 parts of solution, which requires solubility to the extent of at least 20 weight parts per 100 parts of water.

Polymerization of the monomers identified herein can be carried out in a mutual solvent for both, such as in a hydrocarbon solvent, whether aliphatic or aromatic, in a lower alkanol of about 1 to 6 carbon atoms, or in water, with an effective amount of a free radical initiator sufficient to produce the desired composition within an acceptable period of time. The monomeric acid can be used as such or can be in a partially or a completely neutralized form prior to polymerization.

The reaction is conveniently carried out in water as the only reaction medium at a temperature in the range of about 30° C. to about 130° C. usually at atmospheric or slightly elevated pressure. Though the solubility of certain substituted acrylamides in water is poor, the acrylic acid dissolves the substituted acrylamide first, forming a solution which is added to the water or solvent, allowing the reaction to proceed smoothly. The concentration of the copolymer formed may range from about 5% to about 50% by weight, based on total solids, which solution can be shipped directly.

The copolymer may also be formed in an acyclic ketone, such as acetone, or in an acyclic ester, such as ethyl acetate, an alkanol, or in xylene or toluene. If, for example, the copolymer is formed in an organic solvent, or a mixture of an organic solvent and water, the copolymer is converted from the organic solvent solution to a water solution. Typically, the organic solvent is stripped from the solution with steam, or distilled off with subsequent additions of water and repetition of distillation to remove the solvent, followed by the addition of water and a neutralizing agent such as caustic solution, ammonia, a hydrazine, or a low-boiling primary, secondary or tertiary aliphatic amine.

The final aqueous solution of polymer salt is preferably in the range of about pH 2 to about pH 8, with a total solids content of about 2 to about 60% by weight, and preferably about 5 to about 50% by weight of polymer in water.

The copolymers formed may have weight average molecular weight in the range of about 1,000 to about 50,000, and preferably about 2,000 to about 20,000, as determined by gel permeation chromatography. This determination is conventionally made according to ASTM method D-3536-76 (see ASTM Standars, Part 35, 1980), by dissolving the esterified copolymer in tetrahydrofuran and comparing with a solution in THF of polystyrene of known molecular weight. The acid numbers of he copolymers formed, as determined by a conventional titration with KOH, may range from about 310 to about 740, corresponding to a weight fraction of from 40% to about 95% by weight of monomer units having COOH groups. The preferred polymers have more than 50% by weight of free carboxyl groups and an acid number in the range from about 390 to about 700.

In a typical polymerization process, a glass lined or stainless steel jacketed reactor is charged with predetermined amounts of monomers along with the polymerization catalyst under a nitrogen blanket, and the reaction mixture allowed to exotherm under controlled temperature conditions maintained by a heat-transfer fluid in the jacket of the reactor. The pressure under which the reaction occurs is not critical, it being convenient to carry it out under atmospheric pressure.

The copolymers described herein in connection with threshold inhibition of salt-forming scales and dispersion of particulate matter can be used in combination with other conventional additives wherever appropriate. Examples of some of the conventional additions include precipitating agents, oxygen scavengers, sequestering agents, corrosion inhibitors, antifoaming agents, and the like.

The copolymers formed in the manner described herein, were used to treat water which contained calcium ions and phosphate ions in a stirred pH-STAT test while maintaining constant pH and using an automatic tritrator to gauge the effectiveness of the polymer for inhibiting the formation and deposition of calcium phosphate. The test was carried out as follows: a known volume of a phosphate salt solution, such as $Na_2HPO_4$, or another soluble phosphate salt solution, was transferred to a known volume of distilled water in a double-walled glass cell to give a final concentration of 9-10 ppm of orthophosphate ions. To this solution was added slowly and with continuous stirring a known volume of testing polymer solution sufficient to give a dosage of 10 ppm. A pair of glass and reference electrodes, which were calibrated before and after each experiment with standard buffer solutions of pH 7.00 and 9.00, was then immersed in the solution which was maintained at 50° C. by circulating water through the outside of a glass cell jacket. After about 45 minutes, a known volume of calcium chloride solution was slowly added to the continuously stirred solution containing phosphate and polymer, to give a final calcium ion concentration of 140 ppm. The pH of the solution was then immediately brought to pH 8.50 by automatic addition of 0.10M NaOH solution. The pH of the solution was then maintained at $8.50 \pm 0.01$ throughout the experiment using the pH-stat technique. Solution samples were withdrawn after 1 hour and 22 hours, and analyzed, after filtration through 0.22 micrometer filter paper, for orthophosphate ions using the ascorbic acid method, as described in detail in "Standard Methods for the Examination of Water and Waste Water" 14th edition, prepared and published jointly by American Health Association et al. The instrument used for the colorimetric measurements was a Beckman 5270 Spectrophotometer.

Tests for calcium sulfate and calcium carbonate were carried out by the method of Ralston, see *J.Pet.Tech.*, August 1969, 1029–1036.

To test for inhibition of scale due to magnesium hydroxide, a supersaturated solution of $Mg(OH)_2$ in water was prepared which contained approximately the following concentrations: $Mg^{++} = 19$ mg/l, $OH^- = 27$ mg/l, and $NaCl = 3.8\%$. To a 100 ml quantity of the supersaturated solution was added 5 ppm of polymer and the solution stored in polyethylene bottles in an air convection oven at 66° C. for 24 hours. The solution was then filtered through 0.22 micrometer filter paper and the filtrate analyzed for magnesium.

The percent threshold inhibition (TI) attained for each experiment was obtained using the following formula, shown in this case for calcium phosphate:

$$\frac{(PO_4)\ exp - (PO_4)\ final}{(PO_4)\ initial - (PO_4)\ final}$$

where
- $(PO_4)$ exp = concentration of phosphate ion in the filtrate in presence of the copolymer at time 1 and 22 hours
- $(PO_4)$ final = concentration of phosphate ion in filtrate in absence of the copolymer at time 22 hours
- $(PO_4)$ initial = concentration of phosphate ion at time zero.

The invention disclosed herein is demonstrated by the following examples which show preparation of the copolymers and threshold inhibition tests thereof and other related polymers.

EXAMPLE 1

This example demonstrates preparation of a copolymer of acrylic acid and N,N-dimethylacrylamide which monomers were polymerized in isopropanol solvent in respective weight ratio of 80 to 20.

The copolymer was prepared by metering, at a constant rate over a period of 2 hours, a solution of 80 parts acrylic acid and 20 parts of the substituted acrylamide, and 3 parts of a 75% solution in mineral spirits of t-butyl peroxypivalate, into 150 parts of refluxing isopropanol in a reactor. After completing the metering operation, the mixture was heated in reactor at reflux temperature for 1 hour to ensure complete polymerization. The solution was steam-stripped to remove solvent and was diluted with water to give a clear polymer solution. Weight of the polymer solution was 245.5 parts and it contained 39.7% polymer. The acid number of the polymer was 579.

EXAMPLE 2

This example demonstrates polymerization of 80 weight parts of acrylic acid with 20 weight parts of diacetone acrylamide.

Polymerization procedure was identical to that of Example 1. The product was a yellow, slightly cloudy solution, weighing 307.4 weight parts and containing 32.7% polymer. The acid number of the polymer was 574.

EXAMPLE 3

This example demonstrates threshold inhibition of various polymers on calcium phosphate, calcium carbonate, magnesiumhydroxide, and calcium sulfate, at 10 ppm of the polymer. The tests were carried out in the manner described above for 22 hours to determine percent threshold inhibition of calcium phosphate using the various polymers. Results of the tests are given in Table I, below.

TABLE I

| Test No. | Polymer | Wt. Ratio | Mol. Wt. | % TI* $(Ca)_3(PO_4)_2^a$ after 1 hr. | $(Ca)_3(PO_4)_2^a$ after 22 hr. | $CaCO_3^b$ | $CaSO_4^c$ | $Mg(OH)_2^d$ |
|---|---|---|---|---|---|---|---|---|
| 1. | poly(acrylic acid)K732 | 100 | 5100 | 20 | 10 | 68 | 66 | — |
| 2. | poly(acrylic acid)K752 | 100 | 2100 | 27 | 16 | 79 | 99 | — |
| 3. | poly acrylamide | 100 | 4500 | 3 | 1 | — | — | — |
| 4. | poly(acrylic acid/acrylamide) | 90:10 | 5000 | 6 | 4 | 71 | — | — |
| 5. | poly(acrylic acid/N,N—dimethylacrylamide) | 90:10 | 5000 | 40 | 23 | — | — | — |
| 6. | poly(acrylic acid/N,N—dimethylacrylamide) | 80:20 | 5600 | 63 | 58 | 66 | 90 | 55 |
| 7. | poly(acrylic acid/N,N—dimethylacrylamide) | 70:30 | 5060 | 86 | 84 | — | — | — |
| 8. | poly(acrylic acid/N,N—dimethylacrylamide) | 60:40 | 5000 | 90 | 88 | 29 | 56 | 42 |
| 9. | poly(acrylic acid/diacetone acrylamide) | 90:10 | 5780 | 56 | 35 | — | — | — |
| 10. | poly(acrylic acid/diacetone acrylamide) | 80:20 | 5000 | 68 | 64 | 68 | 64 | 45 |
| 11. | poly(acrylic acid/diacetone acrylamide) | 60:40 | 5000 | 22 | 24 | — | — | 28 |
| 12. | poly(acrylic acid/N—t-butyl acrylamide) | 90:10 | 5960 | 62 | 55 | — | — | — |
| 13. | poly(acrylic acid/N—t-butyl acrylamide | 80:20 | 6510 | 80 | 78 | 66 | 86 | 35 |
| 14. | poly(acrylic acid/N—2-(2,4,4-trimethyl pentyl)acrylamide) | 90:10 | 5950 | 24 | 15 | 71 | — | — |
| 15. | poly(acrylic acid/N—2-(2,4,4-trimethyl pentyl)acrylamide | 80:20 | 5000 | 22 | 16 | 75 | — | — |
| 16. | poly(acrylic acid/acrylamide) | 80:20 | 5000 | 18 | 10 | 64 | 79 | — |
| 17. | poly(acrylic acid/ethyl acrylate/t-butyl acrylamide) | 80:10:10 | 5000 | 82 | 83 | 58 | 83 | 34 |
| 18. | poly(acrylic acid/N—isopropyl acrylamide) | 80:20 | 5000 | 87 | 86 | 66 | 64 | 32 |

TABLE I-continued

| Test No. | Polymer | Wt. Ratio | Mol. Wt. | % TI* | | | | |
|---|---|---|---|---|---|---|---|---|
| | | | | $(Ca)_3(PO_4)_2{}^a$ after 1 hr. | $(PO_4)_2{}^a$ after 22 hr. | $CaCO_3{}^b$ | $CaSO_4{}^c$ | $Mg(OH)_2{}^d$ |
| 19. | Natrol-42** | 63:37 | | 48 | 36 | 50 | 49 | — |

*Calculated according to Ralston, J. Pet. Tech. 1029-36 (Aug. 1969)
**more fully described in U.S. Pat. No. 4,029,577
$^a$Conditions: $[Ca^{++}]$ = 140 ppm; $[PO_4]$ = 9.2 ppm; pH = 8.50 ± 0.01; T = 50° C.; time = 1 hr & 22 hr.
$^b$Conditions: $[Ca^{++}]$ = 110 ppm; $[HCO_3]$ = 760 ppm as $HCO_3$; $[O_3]$ = 18 ppm as $CO_3$ T = 66° C.; time = 24 hr.
$^c$Conditions: $[Ca^{++}]$ = 2000 ppm; $[SO_4]$ = 4800 ppm; T = 66° C.; time = 24 hr.
$^d$Conditions: $[Mg^{++}]$ = 19 ppm; $[OH^-]$ = 27 ppm; NaCl = 3.8%; T = 66° C.; time = 24 hr.

The threshold inhibition results presented in Table I are novel and unexpected when considered on the basis of results obtained using polymers that are structurally similar. For instance, the two homopolymers of acrylic acid yielded calcium phosphate percent threshold inhibition of 10% and 16% respectively and the homopolymer of acrylamide yielded threshold inhibition of only 1%. Since threshold inhibition of in excess of about 60% is considered to be acceptable inhibition, and threshold inhibition in excess of 80% is considered to be good inhibition, it should be apparent that homopolymers of acrylic acid and acrylamide are ineffective for the purpose of scale inhibition. The results tabulated in Table I show threshold inhibition for calcium phosphate for the listed copolymer of acrylic acid and substituted acrylamides varying from about 60% to about 90%.

Under certain conditions, the substituted acrylamide can be hydrolyzed, usually under acidic or basic conditions. Completely hydrolyzed copolymers lose their effectiveness as phosphate inhibitors and have effectiveness comparable to poly(acrylic acid), which is low, as has already been demonstrated. Partially hydrolyzed copolymers can retain sufficient effectiveness as phosphate inhibitors and can be useful herein.

We claim:

1. A method for inhibiting the precipitation of phosphate scale in an aqueous medium comprising the step of adding to the aqueous system about 0.05 to 500 ppm water-soluble non-crosslinked random copolymer of 50 to 90 weight parts of an acrylic acid and 10 to 50 weight parts of a substituted acrylamide, on the basis of a total of 100 weight parts of polymerized monomers, said copolymer having weight average molecular weight in the range of about 1,000 to 50,000 and the polymerized units of an acrylic acid and a substituted acrylamide are defined by the following formula:

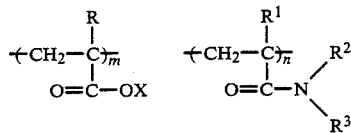

where m is in the range of about 10 to 700 and n is in the range of about 0.1 to 350, subject to the molecular weight limitations; R and $R^{1'}$ are individually selected from hydrogen and methyl; X is selected from hydrogen, sodium, potassium, calcium, ammonium, and magnesium moieties; and $R^2$ and $R^3$ are individually selected from hydrogen, and substituted and unsubstituted groups each containing a total of 1 to 8 carbon atoms, wherein the substituents on $R^2$ and/or $R^3$ are selected from alkyl, aryl, and keto groups, provided that either $R^2$ and/or $R^3$ is other than hydrogen.

2. Method of claim 1 wherein said aqueous system is selected from process waters used in a steam generating system, a recirculating cooling water system, a gas scrubbing system, a desalination water system, and a crude petroleum recovery system.

3. Method of claim 1 wherein said acrylic acid is acrylic acid itself, and said substituted acrylamide is selected fom diacetone acrylamide, N-t-butylacrylamide, and N,N-dimethylacrylamide.

4. Method of claim 1 wherein said scale is calcium phosphate formed in a system for processing fruit juice wherein said aqueous system is fruit juice and wherein said amount of said copolymer is 0.05 to 10 ppm.

5. Method of claim 4 wherein said copolymer has molecular weight in the range of about 2,000 to 20,000.

6. Method of claim 5 wherein the amount of said copolymer in the aqueous system is in the range of about 0.1 to 1 ppm.

7. Method of claim 6 wherein said acrylic acid is selected from acrylic acid itself and methacrylic acid, and said substituted acrylamide is selected from diacetone acrylamide, N-alkylacrylamides, and N,N-dialkylacrylamides containing 1 to 8 carbons in each alkyl group.

8. Method of claim 1 wherein said aqueous system is selected from process water in a recirculating water system, fruit juice, brine, brackish water, and water containing petroleum and hyrocarbon gases.

9. Method of claim 8 wherein said copolymer has molecular weight in the range of about 2,000 to 20,000.

10. Method of claim 9 wherein said acrylic acid is selected from acrylic acid itself and methacrylic acid, and said substituted acrylamide is selected from diacetone acrylamide, N-alkylacrylamides, and N,N-dialkylacrylamides containing 1 to 8 carbons in each alkyl group.

11. Method of claim 1 wherein said aqueous medium contains clay, calcium carbonate, iron oxides and mixtures thereof, which is dispersed by adding to said process water from 1 ppm to 200 ppm of said copolymer.

12. Method of claim 11 wherein said copolymer has molecular weight in the range of about 2,000 to 20,000, and wherein said acrylic acid is selected from acrylic acid itself and methacrylic acid, and said substituted acrylamide is selected from diacetone acrylamide, N,N-dialkylacrylamides, and N-monoalkylacrylamides containing 1 to 8 carbons in each alkyl group.

13. Method of claim 1 for inhibiting precipitation of calcium phosphate scale wherein molecular weight of said copolymer is in the range of about 2,000 to 20,000, wherein amount of said copolymer is in the range of about 0.1 to 200 ppm; wherein said acrylic acid is selected from acrylic acid itself and methacrylic acid; and wherein said substituted acrylamide is selected from diacetone acrylamide, N,N-dialkylacrylamides, and N-monoalkylacrylamides containing 1 to 8 carbon atoms in each alkyl group.

14. Method of claim 13 wherein said aqueous system is a recirculating cooling water system.

15. Method of claim 13 wherein said copolymer is selected from a first copolymer of 80 parts of acrylic acid and 20 weight parts of t-butyl acrylamide, and a second copolymer of 60 weight parts of acrylic acid, 20 weight parts of t-butyl acrylamide, and 20 weight parts of methacrylic acid, said amounts being based on a total of 100 weight parts of all monomers used in preparing said copolymer.

* * * * *